United States Patent [19]

Kamata et al.

[11] Patent Number: 4,460,937
[45] Date of Patent: Jul. 17, 1984

[54] GAS-INSULATED SWITCHING APPARATUS

[75] Inventors: Isao Kamata, Sagamihara; Satoshi Oyama, Yamato, both of Japan

[73] Assignee: Tokyo Shibaura Denki Kabushiki Kaisha, Kawasaki, Japan

[21] Appl. No.: 377,445

[22] Filed: May 12, 1982

[30] Foreign Application Priority Data

May 12, 1981 [JP] Japan .................................. 56-70135

[51] Int. Cl.$^3$ ........................ H02B 5/02; H01H 33/54
[52] U.S. Cl. ............................... 361/333; 200/148 B; 200/145; 361/335; 361/131
[58] Field of Search ............... 200/145, 148 R, 148 B; 361/131, 332, 333, 335

[56] References Cited

U.S. PATENT DOCUMENTS

| | | | |
|---|---|---|---|
| 3,777,218 | 12/1973 | Kessler | 361/131 |
| 3,881,766 | 5/1975 | Pratsch | 361/131 |
| 3,903,387 | 9/1975 | Sasaki et al. | 200/145 |
| 4,291,363 | 9/1981 | Oishi | 361/333 |

*Primary Examiner*—Robert S. Macon
*Attorney, Agent, or Firm*—Oblon, Fisher, Spivak, McClelland & Maier

[57] ABSTRACT

A gas-insulated switching apparatus is disclosed which includes a circuit breaker having a breaking section with at least a couple of mutually detachable contacts and a grounded tank containing the breaking section and filled with an insulating gas, the grounded tank being maintained at earth potential. A first bushing is vertically mounted on one side of the grounded tank, the central conductor of the first bushing being connected with one of the contact of the breaking section. A disconnecting switch has insulating gas sealed in it and accommodates a disconnecting section in a tank which is arranged connected to but gas-partitioned from the circuit breaker in an axially extending region of the grounded tank on the other side of the region where the first bushing is mounted. A bushing support tank has insulating gas sealed in it and is arranged so that is connected to but gas-partitioned from the disconnecting switch in an axially extending region of the grounded tank on the side of the disconnecting switch which is opposite to that of the circuit breaker. A second bushing is vertically mounted on the bushing support tank and a grounded switch is arranged inside the bushing support tank in a region which is an axially extending region of the circuit breaker. A lightning arrester is arranged gas-partitioned from the bushing support tank below the axis of the circuit breaker and the disconnecting switch but in the direction of this axis. The lightning arrester is electrically connected to the central conductor of the second bushing inside the bushing support tank.

5 Claims, 4 Drawing Figures

GAS-INSULATED SWITCHING APPARATUS

BACKGROUND OF THE INVENTION

1. Field of the Invention

This invention relates to a gas-insulated switching apparatus and more particularly to a gas-insulated switching apparatus suitable for a partially gas-insulated extra ultra-high voltage gas switching apparatus of the capacity on the order of 500 kV.

2. Description of the Prior Art

With the increase in demand for electric power in recent years, network lines have been installed in high power transmission lines with a capacity of 500 kV or thereabouts. This requires switching apparatus of the capacity on the order of 500 kV to be used with the transmission lines. If an air-insulated apparatus is used in the switching apparatus of the capacity on the order of 500 kV, an inter-pole or inter-phase distance of about 8 m is required for each power-applied section, resulting in a very large space needed for installation of the switching apparatus. To obviate this shortcoming, a gas-insulated switching apparatus has been suggested which has a housing incorporating component devices insulated from each other by means of $SF_6$ gas or other medium superior in insulating ability. Such a gas-insulated switching apparatus has been mainly in the form of an ultra small fully gas-insulated switching apparatus in which even the bus device is completely insulated by the gas. The bus device insulated by gas is much higher in cost than the air-insulated bus device, thus leading to a higher cost of the switching apparatus as a whole. For this reason, another type of gas-insulated switching apparatus has been suggested in which circuit breakers, disconnecting switches, the grounded switch and the current transformer, except for the bus device, are gas-insulated. In such a switching apparatus with its bus device air-insulated, it is necessary to provide bushings for connecting the gas-insulated portions with the air-insulated bus device.

As shown in U.S. Pat. No. 3,903,387, the bushing is mounted on a bushing support tank. The bushing support tank is arranged at an end of the grounded tank in which a circuit breaker is accommodated. A disconnecting switching is accommodated in this bushing support tank. In general, it is necessary to provide a grounded switch and a lightning arrestor for coordination of insulation to lightning surges in the gas-insulated switching apparatus. A central conductor of the bushing is connected to a fixed contact of the disconnecting switch which is provided in the upper side of the bushing support tank. A fixed contact of the earthed switch is provided on the fixed contact of the disconnecting switch. A movable contact of the disconnecting switch is connected to a fixed contact of the circuit breaker through an insulating spacer. The lightning arrestor is provided on the side of the bushing support tank which is the opposite to that of the circuit breaker.

With such a construction, since the grounded switch is arranged at a location positioned relatively above the disconnecting switch, the various sliding metal particles which are produced when it is actuated fall down inside the bushing support tank and accumulate on the insulating spacer, which supports the movable contact of the disconnecting switch. Over a period of years, this accumulation of metal particles on the insulating spacer causes a deterioration in its insulating properties. Particularly in recent years as large-scale, large-capacity power transmission (257 kV, 8 ka) has come into use, the switching duty of grounded switches, which are used in gas-insulated switching apparatus employed in power transmission systems, has become more severe than hitherto. As an example, a switching capability of 50 kV-1000 A induced current circuit breaking is now required.

In order to give a grounded switch such a switching capability, what is called a "puffer blast" or the like, having a gas blast function, is used for the contacts. However, it is difficult to accommodate such a grounded switch in the bushing support tank as it makes the switch mechanism too large. Moreover the amount of dust produced during circuit breaking of the induced current necessarily increases, which dust accumulates on the insulating spacer, lowering its insulating capability, and inevitably leading to a need to give consideration to dirt-resistant insulating spacers which provide a long insulating distance along their surface, and to spacers which are in fact a whole size larger. Additionally, the position in which the grounded switch is mounted is comparatively elevated, so it often becomes necessary to provide a special operating floor for operation and inspection.

SUMMARY OF THE INVENTION

An object of the invention is to provide a gas-insulated switching apparatus which has an increased reliability.

Another object of the invention is to provide a gas-insulated switching apparatus in which can be easily carried out maintenance or inspection of the earthed switch.

Still another object of the invention is to provide a gas-insulated switching apparatus which is easily constructed.

A further object of the invention is to provide a gas-insulated switching apparatus which can be prevented from heat-induced deterioration in the lightning arrestor.

To achieve the above-mentioned objects, the gas-insulated switching apparatus according to the invention has a circuit breaker including a breaking section with at least a couple of mutually detachable contact and a grounded tank containing the breaking section and filled with an insulating gas with the grounded tank being maintained at earth potential. A first bushing is vertically mounted on one side of the grounded tank with the central conductor of the first bushing being connected with one of the contacts of the breaking section. A disconnecting switch, which has insulating gas sealed in it, accommodates a disconnecting section in a tank which is arranged so that it is connected to but gas-partitioned from the circuit breaker in an axially extending region of the grounded tank on the other side of the region from that side on which the first bushing is mounted. A bushing support tank, which has insulating gas sealed in it, is arranged so that it is connected to, but gas-partitioned from a disconnecting section in an axially extending region of the grounded tank on the side of the disconnecting switch which is the opposite to that of the circuit breaker. A second bushing is vertically mounted on the bushing support tank, and a grounded switch is arranged inside the bushing support tank in a region which is an axially extending region of the circuit breaker. A lightning arrester is arranged so that it is gas-partitioned from the bushing support tank below the axis of the circuit breaker and disconnecting switch but in the direction of this axis with the lightning arrester being electrically connected to the central conductor of the second bushing inside the bushing support tank.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
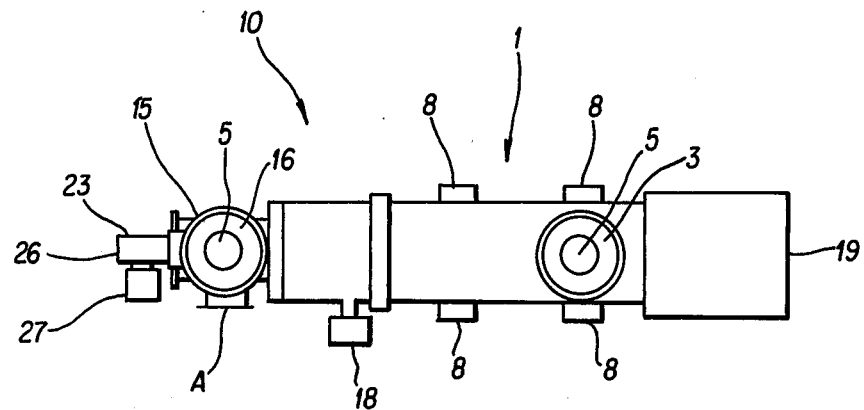
FIG. 1 is an elevational view of the gas-insulated switching apparatus according to an embodiment of the invention.
Figure 2:
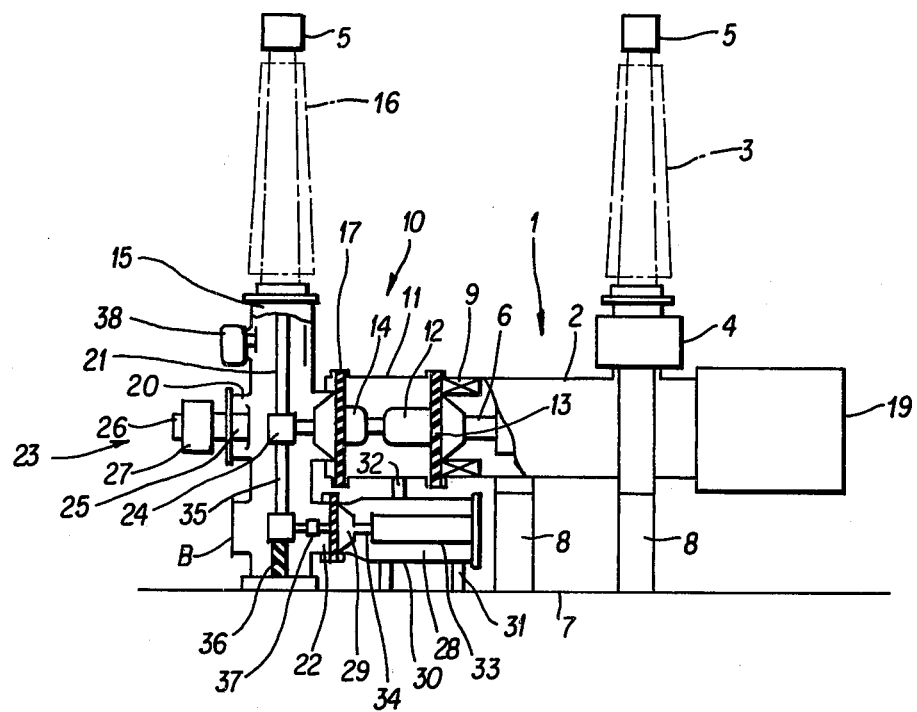
FIG. 2 is a front view of the gas-insulated switching apparatus shown in FIG. 1.

Referring now to the drawings, wherein like reference numerals designate identical or corresponding parts throughout the several views, and more particularly to FIGS. 1 and 2 thereof, the reference numeral 1 shows a circuit breaker including a breaking section and a grounded tank 2 containing the breaking section and filled with an insulating gas, the grounded tank 2 being maintained at earth potential. One terminal of the breaking section is connected to the central conductor (not shown) of a bushing 3 through a current transformer 4. A top shield 5 is mounted on the top of the bushing 3. Another terminal 6 projects from the breaking section at one end of the grounded tank 2. The grounded tank 2 is supported upwardly of the base 7 by means of support members 8. Reference numeral 9 shows a current transformer arranged inside the conduit line of the terminal 6. Reference numeral 10 shows a disconnecting switch which is arranged at the axial end of the circuit breaker 1 and is made up of a disconnecting section explained in detail later which is accommodated in a tank 11 and in which insulating gas is sealed. One of the terminals 12 of the disconnecting switch 10 is connected to one terminal 6 of the circuit breaker 1 through the insulating spacer 13. Its other terminal 14 is led out into a bushing support tank 15 in which is vertically disposed an air bushing 16, through an insulating spacer 17. Reference numeral 18 is an operating mechanism for the disconnecting switch 10, and is mounted in the direction at right angles to the axis of the said circuit breaker 1.

Bushing support tank 15 is further provided on an axially extending portion of the disconnecting switch 10, which is in turn arranged on an axially extending portion of the circuit breaker 1. The circuit breaker 1, disconnecting switch 10, and bushing support tank 15 are therefore connected in a straight line. The breaking section of the circuit breaker 1 is switched by an operating mechanism 19 which is directly connected to the terminal which is opposite to the side on which the disconnecting switch 10 of the circuit breaker 1 is provided. The bushing support tank 15 is of a vertically elongate shape extending in the direction at right angles to the axial direction of the tank 2 of the circuit breaker 1, and has insulating gas sealed within it. The bushing 16 is mounted vertically at its upper end. On the side of the bushing support tank 15 which is opposite to the disconnecting switch 10, there is provided an opening 20 which faces at right angles the axis of the central conductor 21 of the bushing 16. An opening 22 is provided below the bushing support tank 15 in vertical relationship to the disconnecting switch 10. In particular, one opening 20 is provided at a position aligned with the axis of the tank of the circuit breaker 1, and is connected to a grounded switch 23. The fixed contact 24 of this grounded switch 23 supports the other terminal 14 of the disconnecting switch 10 and is connected to the central conductor 21 of the bushing 16, supported by the insulating spacer 17, which partitions the gas.

The movable contact 25 is arranged opposite to the fixed contact 24 of the grounded switch 23, and is driven by a switch mechanism 26 and operating mechanism 27. A lightning arrester 28 is joined on at the opening 22 on the other side, through an insulating spacer 29, which partitions the gas, the lightning arrester 28 being arranged below the disconnecting switch 10 and parallel with it. The tank 30 of the lightning arrester 28 is supported by a support foot 31 and supports the disconnecting switch 10 by a support foot 32, so that the disconnecting switch 10 is effectively supported by the lightning arrester 28. In the lightning arrester 28, an internal element 33 is accommodated in a tank together with insulating gas. This internal element 33 which consists of a non-linear resistor mainly composed of metal-oxide is led out into the bushing support tank 15 through a conductor 34. The central conductor 21 of the bushing 16 is provided with a conductor 35 as an axially extending portion thereof. The free end of this conductor 35 is supported by an insulating body 36. The conductor 35 and the conductor 34 of the lightning arrester 28 are connected via a detachable conductor 37. In the FIGS. 1 and 2, respectively, are viewers provided so that inspection of the fixed contact 24 of the grounded switch 23 and attachment or removal of the conductor 37 can be carried out. Specifically, viewer A is provided on the side face of the bushing support tank 15 which is positioned at right angles to the direction of switching of the grounded switch 23, and viewer B is provided on the side face of the bushing support tank 15 in a region extending axially from the lightning arrester 28. Reference numeral 38 is an intermediate electrode which is arranged concentrically around the conductor 35, so as to provide a voltage detection function due to capacitative voltage division by the conductor 35 and the electrode 38.

Figure 3:
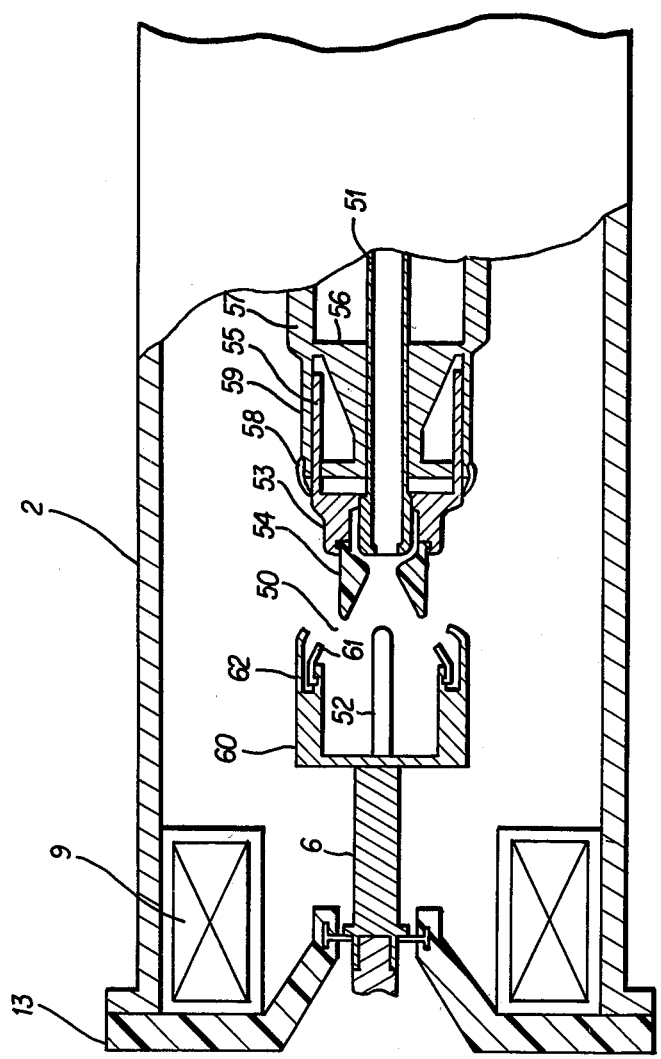
FIG. 3 is a sectional view showing the circuit breaker of the gas-insulated switching apparatus in FIG. 2.

The circuit breaker shown in FIG. 2 will be explained in detail with reference to FIG. 3. The breaking section 50 comprises a fixed arcing contact 51 and a movable arcing contact 52 attachable to and detachable from the fixed arcing contact 51.

A movable main contact 53 surround the movable arcing contact 51 and is connected with the movable arcing contacts 51 electrically and mechanically. A nozzle 54 of insulating material is positioned outside of the movable arcing contact, so that the arc between contacts 50 and 51 is blasted out when the breaking section 50 is opened. A puffer cylinder 55 extends from the movable main contact 53 in the opposite direction of the nozzle 54 and is guided over the supporting material 56 which forms a puffer piston, during the opening motion to form a puffer chamber with the supporting material 56. This material 56 projects from a casing 57 and is connected with the puffer cylinder 55 which is connected with the movable main contact 53 electrically and mechanically, via a plurality of resilient fingers 58 which are engaged with supporting material 59 which project from the center casing 57. The fixed arcing contact 52 is engaged with a fixed main contact 60. At the top of the fixed main contact 60, a plurality of resilient fingers 61 are shielded by shield 62 to insure a smooth electric field between contacts 51, 52. The switching of the contacts 50 and 53 is prior to that of the contacts 51 and 52.

Figure 4:
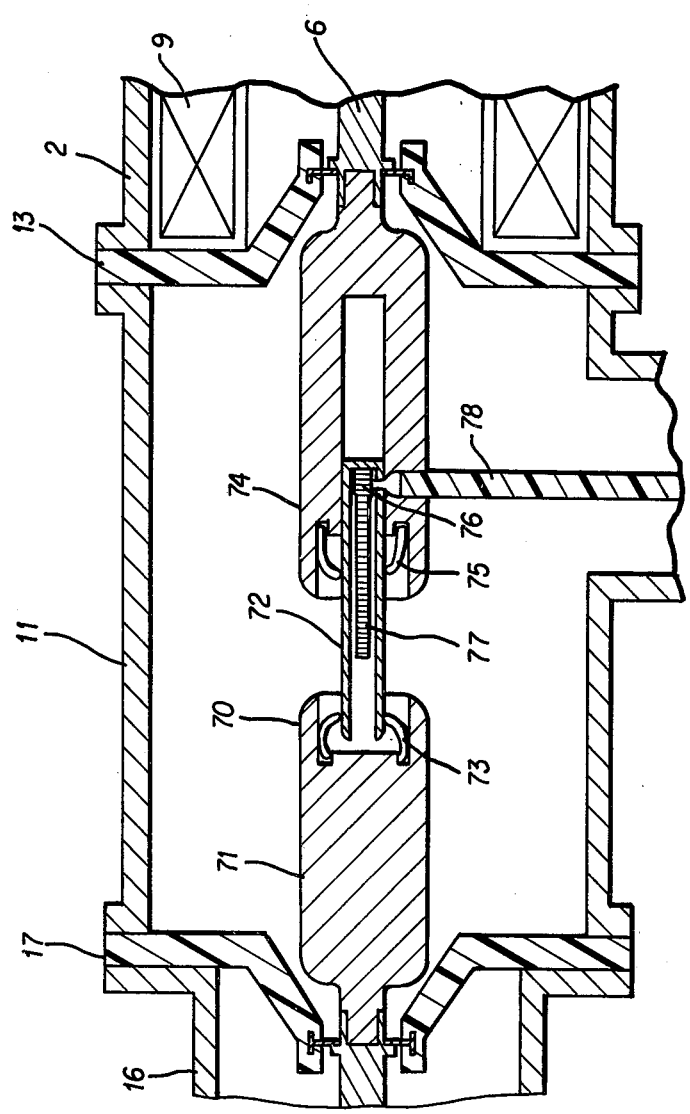
FIG. 4 is a sectional view showing the disconnecting switch of the gas-insulated switching apparatus in FIG. 1.

The disconnecting switch shown in FIG. 1 will be explained in detail with reference to FIG. 4. The disconnecting section 70 comprises a fixed contact 71, a movable contact 72 attachable to and detachable from the fixed contact 71. The fixed contact 71 is supported by an insulating spacer 17. A plurality of resilient fingers 73 is arranged on the top of the fixed contact 71. A conductor tube 74 is supported by the insulating spacer 13 and is connected to the fixed main contact 60 of the circuit breaker 1 through the terminal 6. A plurality of resilient fingers 75 is arranged on the top of the conductor tube 74. The movable contact 72 has the shape of a tube and is accommodated in the conductor tube 74 and can be moved to and fro. A pinion 76 and a rack 77 which meshes with the pinion 74 are accommodated in the movable contact 72. The pinion 74 is operated by the operating mechanism 19 through an insulating operating rod 78.

This constructional arrangement can cope with the trend to increased capacity of circuit breakers 1, which has continued to progress remarkably in recent years. Specifically, with increased circuit breaking performance, the number of circuit breaking points can often be reduced by half. For example with 300 kV class circuit breakers, the number can be reduced from two to one, or with 550 kV class circuit breakers, the number can be reduced from four to two. This means that the axial length of the tank of the circuit breaker 1 can be decreased. However, considering a single circuit breaking point, in order to maintain the air insulating distance between the head parts of the bushings 3, 16, it is necessary to fix the bushings on the tank in inclined fashion. However, in a complicated switch apparatus, due to the need for rational arrangement of the various devices, inclined arrangement of the bushings is not necessary.

Specifically, arrangement of the bushings at right angles to the axis of the circuit breaker tank is advantageous from the point of view of earthquake strength, and facilitates setting the strength of the openings of the bushing in the region in which the bushings are mounted. It also facilitates manufacture of the tank. The required spacing between the bushing which must be maintained for air insulation can be guaranteed by arranging a disconnecting switch between them. Taking as an example the 300 kV single circuit-breaker class, the minimum necessary distance from the point of view of insulation is less than 2.5 m, or about 1.8 m when the bushing is vertically mounted on top of the disconnecting switch. When, in accordance with this invention, it is vertically mounted on the bushing support tank 15, a sufficient distance can be set at 2.7 m, approximately. Furthermore, due to this constructional arrangement, the disconnecting switch 10 and grounded switch 23 are separated into different containers, so, notwithstanding the fact that the severe switching duty, which the grounded switch 23 has to perform when it is used in a large-capacity power transmission network, produces as described previously, a quantity of dust produced by the circuit-breaking operation, since this dust is produced remote from the disconnecting switch 10, it does not collect as dirt on the surface of the insulator. The reliability of insulation is therefore very considerably increased. Furthermore, the grounded switch 23, the circuit breaker 1, the disconnecting switch 10, and bushing support tank 15 are arranged on a straight line, so the support level of the bushing 16 can be decreased, making it possible to achieve a further improvement in earthquake strength.

Additionally, a conductor 37 is provided in the bushing support tank 15 for connection to a lightning arrester 28. Since this conductor is detachable, when a voltage test is to be carried out in the factory and on site after installation, by removing the conductor 37, it can be ensured that severe voltage stress is not applied to the internal element 33 of the lightning arrester 28. This avoids adverse effects on the life of the element 33. Furthermore, by arranging the lightning arrester 28 in the space below the bushing support tank, i.e., below the circuit breaker 1 and disconnecting switch 10, which are positioned on the same straight line, the arrangements for supporting the heavy weight of the lightning arrester can be simplified and the arrangement space can be better organized. Deterioration of the element 33 of the lightning arrester 28 is accelerated by heat but the arrangement of the lightning arrester below the disconnecting switch 10 means that the disconnecting switch 10 screens the lightning arrester from heat from the sun thereby preventing heat-induced deterioration thereof.

Consequently, the constructional arrangement of this invention results in excellent insulating characteristics when applied to composite switches used in large-capacity power transmission systems. Even if the circuit breaker used is small, the required insulating distance between the bushings is maintained and there are no unnecessary bus portions. This makes it possible to reduce the size of the whole installation. Furthermore the arrangement of the bushing at both ends on a straight line is advantageous from the point of view of the arrangement of the subsection as a whole.

Since the lightning arrester 28 is arranged below the disconnecting switch 10, it can be ensured that the lightning arrestor 28 is not heated by the sun. This makes it possible to preventheat-induced deterioration of the internal element 33.

The invention is not restricted to the above embodiment but may be embodied in the following modified forms also. In FIG. 1 the positions of the switch mechanism 26 of the grounded switch 23 and the viewer A may be interchanged. This results in the movable contact of the grounded switch 23 is driven at a right angle to the axial direction of the circuit breaker. In this case the positions of the operating mechanism 27 and the switch mechanism 26 being altered, but since these are quite small overall, as can be seen from FIG. 1, the dimension at right angles to the axial direction of the circuit breaker does not become large. In such a case, the viewer A is formed in a region extending axially of the circuit breaker.

Thus, as explained above, with this invention, the air insulation distance of the bushing can be maintained without needing to insert a special bus device simply for this purpose. This enables requirements for further reduction in the size of circuit breakers to be met. Furthermore, since the disconnecting switch and grounded switch are in separate gas compartments, when the grounded switch reaches the required number of times of actuation (for example, 200 times may be taken as the standard for inspection of a grounded switch having a current switching capability), inspection of the contacts can be easily carried out from the viewer provided in the grounded switch, thereby facilitating the recovering of the gas from the bushing. Since the various devices are arranged in a straight line, the level of support of the bushing may be reduced and the earthquake strength improved, specifically, in the embodiment described, a lowering corresponding to the inter-electrode insulation distance of the disconnecting switch may be achieved. A further merit is that a construction is easily obtained in which circuit-breaking dust, produced when the current is switched by the grounded switch, does not tend to accumulate on the insulating spacer.

Yet another advantage is that the operating devices of the various apparatus can be set at a comparatively low level so that a special operating floor or the like for use in maintenance, inspection or manual operation of the operating devices is not necessary. It is desirable to avoid actuation of the lightning arrester during a withstand voltage test carried out in the works or after installation on site, and to prevent the adverse effects on the life of the internal element produced by overvoltage, by isolating it. Previous practice was to construct the lightning arrester as a disconnecting switch but dispensing with the disconnecting function during normal operation, when it acted simply as a connecting conductor. However, this was not economical. In contrast, with the present invention, it was noted that it would be sufficient to isolate the internal element durng the withstand voltage test only, and a detachable conductor was therefore provided within the bushing support tank for this purpose. In this way an economic construction can be achieved. Furthermore the internal element of the lightning arrestor can be prevented from heat-induced deterioration.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A gas-insulated switching apparatus comprising:
   a circuit breaker including a breaking section with at least two mutually detachable contacts and a grounded tank containing said breaking section and filled with an insulating gas, said grounded tank being maintained at earth potential;
   a first bushing which is vertically mounted on one side of said grounded tank, the central conductor of said first bushing being connected with one of the contact of said breaking section;
   a disconnecting switch which has insulating gas sealed in it and which accommodates a disconnecting section in a tank which is arranged connected to but gas-partitioned from the circuit breaker in an axially extending region of the grounded tank on the other side of the region where said first bushing is mounted;
   a bushing support tank which has insulating gas sealed in it and is arranged connected to but gas-partitioned from the said disconnecting switch in an axially extending region of the grounded tank on the side of the disconnecting switch which is the opposite to that of the said circuit breaker;
   a second bushing which is vertically mounted on said bushing support tank;
   a grounded switch arranged inside said bushing support tank in a region which is an axially extending region of said circuit breaker;
   a lightning arrester arranged so that it is gas-partitioned from said bushing support tank below the axis of the said circuit breaker and disconnecting switch but in the direction of this axis, said lightning arrester being electrically connected to the said central conductor of the second bushing inside the bushing support tank.

2. A gas-insulated switching apparatus according to claim 1, in which the movable contact of the grounded switch is in the bushing support tank in a position coincident with the axis of the circuit breaker.

3. A gas-insulated switching apparatus according to claim 1, in which the grounded switch is arranged in a plane which intersects at right angles the axis of the circuit breaker.

4. A gas-insulated switching apparatus according to claim 1, in which the lightning arrester and the disconnecting switch which is arranged above this lightning arrester are jointed by a support member.

5. A gas-insulated switching apparatus according to claim 1, in which said lightning arrester and said central conductor of the second bushing are connected via a detachable conductor.

* * * * *